(12) United States Patent
Meng et al.

(10) Patent No.: US 9,106,300 B1
(45) Date of Patent: Aug. 11, 2015

(54) METHOD AND APPARATUS FOR DETECTING NARROW-BAND INTERFERENCE IN A COMMUNICATION SYSTEM

(71) Applicant: Marvell International Ltd., Hamilton (BM)

(72) Inventors: Yuji Meng, Shanghai (CN); Yicheng Chen, Shanghai (CN); Jin Zhang, Pleasanton, CA (US); Kok-Wui Cheong, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/516,848

(22) Filed: Oct. 17, 2014

Related U.S. Application Data

(60) Provisional application No. 61/892,628, filed on Oct. 18, 2013.

(51) Int. Cl.
*H04B 1/10* (2006.01)
*H04B 17/00* (2015.01)

(52) U.S. Cl.
CPC .......... *H04B 1/1036* (2013.01); *H04B 17/0055* (2013.01); *H04B 2001/1072* (2013.01)

(58) Field of Classification Search
CPC ............ H04B 1/1036; H04B 17/0055; H04B 2001/1072; H04B 1/1027; H04B 15/00; H04B 1/71; H04B 1/7102
See application file for complete search history.

(56) References Cited

U.S. PATENT DOCUMENTS

| | | | |
|---|---|---|---|
| 2005/0135492 A1* | 6/2005 | Jia et al. ......................... | 375/260 |
| 2005/0152317 A1* | 7/2005 | Awater et al. ................. | 370/338 |
| 2008/0043888 A1* | 2/2008 | Bhukania et al. ............. | 375/346 |
| 2008/0292032 A1* | 11/2008 | Belogolovy et al. .......... | 375/346 |
| 2011/0053546 A1* | 3/2011 | Hess et al. ..................... | 455/296 |
| 2012/0128048 A1* | 5/2012 | Dabiri .......................... | 375/224 |
| 2014/0274132 A1* | 9/2014 | Abdelmonem et al. ... | 455/456.2 |

\* cited by examiner

*Primary Examiner* — Leon Flores

(57) ABSTRACT

Aspects of the disclosure provide a method for detecting interference. The method includes receiving a plurality of frequency components of a signal received at a first device, identifying, among the plurality of frequency components, first frequency components that are not corrupted by interference, determining a noise power threshold based on the first frequency components, and comparing powers of the plurality of frequency components with the noise power threshold to determine second frequency components to be suppressed during decoding of the signal.

20 Claims, 4 Drawing Sheets

METHOD AND APPARATUS FOR DETECTING NARROW-BAND INTERFERENCE IN A COMMUNICATION SYSTEM

INCORPORATION BY REFERENCE

This present disclosure claims the benefit of U.S. Provisional Application No. 61/892,628, "Single-Round Computing Method for Detecting Multiple Narrow-Band Interferences (NBIs)" filed on Oct. 18, 2013, which is incorporated herein by reference in its entirety.

BACKGROUND

Wireless communication systems and wireline communication systems may suffer from narrow-band interference (NBI). In an example, wireless local area networks (WLAN), e.g. 802.11a/g, suffer from NBI generated by Bluetooth devices operating in a similar frequency band. In another example, wired systems, such as Digital Subscriber Lines (DSL), power line communications (PLC) and the like, suffer from interference of shortwave radio.

SUMMARY

Aspects of the disclosure provide a method for detecting interference. The method includes receiving a plurality of frequency components of a signal received at a first device, identifying, among the plurality of frequency components, first frequency components that are not corrupted by interference, determining a noise power threshold based on the first frequency components, and comparing powers of the frequency components with the noise power threshold to determine second frequency components to be suppressed during decoding of the signal.

In an embodiment, the method includes receiving the signal during a time period when a second device does not transmit signals that use the frequency components to carry information to the first device. In an example, the method includes detecting, based on the plurality of frequency components, that the frequency components do not carry the information from the second device to the first device.

According to an aspect of the disclosure, the method includes identifying, among the plurality of frequency components, the first frequency components that are not corrupted by narrow-band interference (NBI). In an embodiment, the method includes determining a first frequency component that is not corrupted by the interference, and comparing the power at each frequency component with the power of non-corrupted frequency components to identify the first frequency components. To determine the first frequency component that is not corrupted by the interference, the method includes selecting, from a band of frequency components, a frequency component with a minimum power.

Further, in an embodiment, the method includes identifying a frequency component having narrow band interference when the frequency component has a larger power than the noise power threshold, and suppressing the identified frequency component and frequency components in a neighbor band of the identified frequency component during decoding of the signal. In an example, the method also includes adjusting a width of the neighbor band based on a power at the frequency component.

Aspects of the disclosure provide a receiving circuit. The receiving circuit includes an interference detector configured to identify, among a plurality of frequency components of a received signal, first frequency components that are not corrupted by interference, determine a noise power threshold based on the first frequency components, and compare powers of the frequency components with the noise power threshold to determine second frequency components that are corrupted by the interference. Further the receiving circuit includes a processing circuit configured to suppress the second frequency components during decoding of the received signal.

Aspects of the disclosure provide an apparatus that includes a frequency domain transform module, an interference detector and a processing circuit. The frequency domain transform module is configured to transform a received signal into a plurality of frequency components. Each frequency component has an associated power. The interference detector is configured to identify, among the plurality of frequency components, first frequency components that are not corrupted by interference, determine a noise power threshold based on the first frequency components, and compare powers of the plurality of frequency components with the noise power threshold to determine second frequency components that are corrupted by the interference. The processing circuit configured to suppress the second frequency components during decoding of the received signal.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
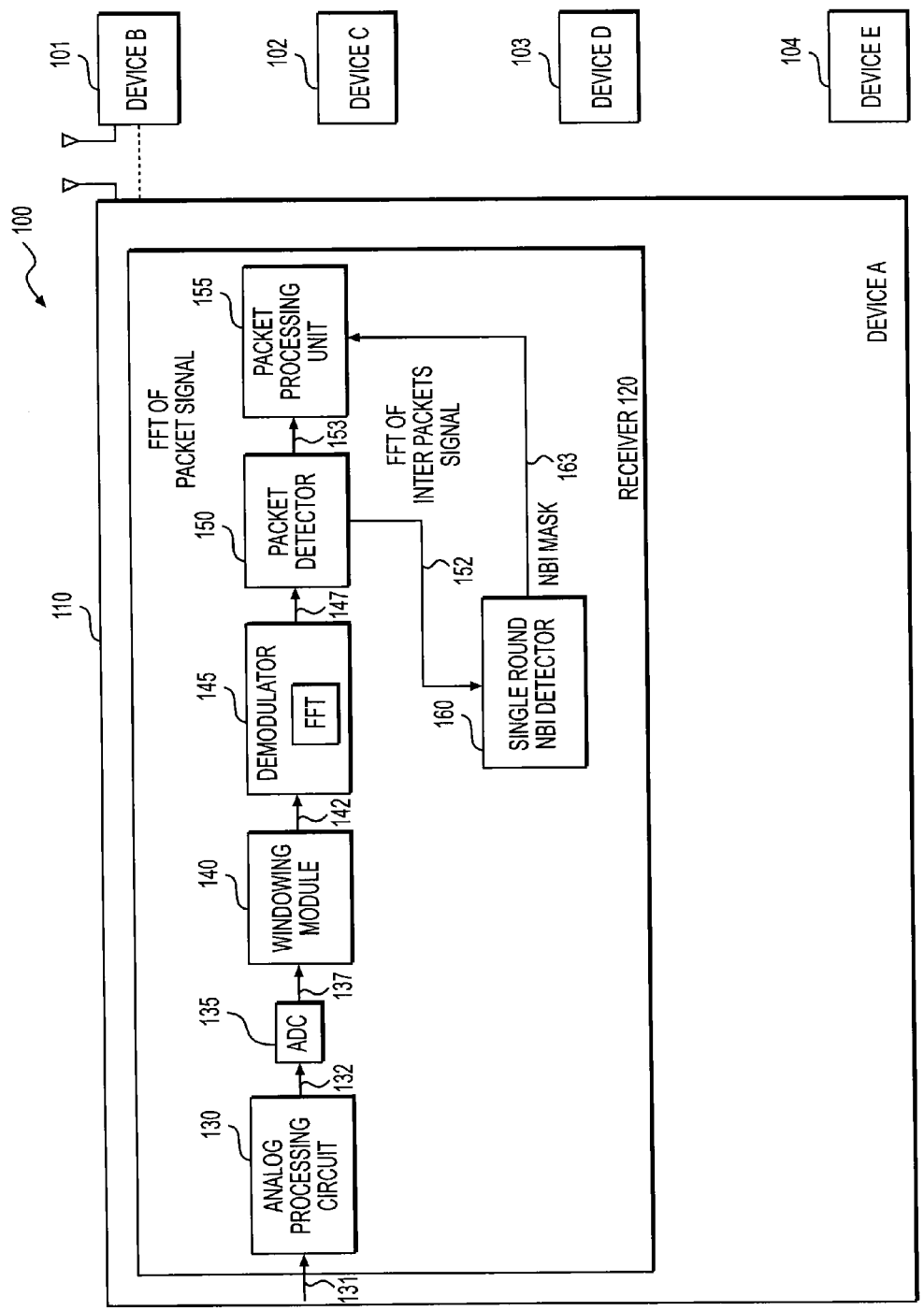
FIG. 1 shows a block diagram of an electronic device 110 according to an embodiment of the disclosure.

FIG. 1 shows a block diagram of a communication system 100 including an electronic device 110 according to an embodiment of the disclosure. In FIG. 1, the electronic device 110 is depicted as being in communication with another electronic device, e.g., an electronic device 101. The electronic device 110 is configured to detect narrow-band interference (NBI) from other devices, such as the devices 102-104, and is configured to cancel or mitigate the NBI to improve quality of the communication with the electronic device 101.

The electronic device 110 can be any suitable device, such as a desktop computer, a laptop computer, a tablet computer, a smart phone, an access point, a wireless modem, a wireless router, a digital subscriber line (DSL) modem, and the like. In an example, the electronic device 110 is a laptop computer and the electronic device 101 is an access point in a wireless local area network (WLAN). The electronic device 110 communicates with the electronic device 101 according to a wireless standard, such as IEEE 802.11a/g, and the like. In an example, other electronic devices, such as devices 102-104, operate in a frequency band that is about the same as the electronic devices 110 and 101. For example, the devices 102-104 are Bluetooth devices, and the signals transmitted from the devices 102-104 are narrow-band interference (NBI) signals to the wireless communication signals transmitted between the electronic devices 110 and 101.

In another example, the electronic device 110 is a DSL modem coupled to the electronic device 101, such as a DSL access multiplexer, and the like via copper wires. The signals received by the electronic device 110 via the copper wires can be affected by short wave radio which is the narrow-band interference to the communication signals transmitted between the electronic devices 110 and 101 via the copper wires.

In an embodiment, orthogonal frequency-division multiplexing (OFDM) technology is used by the electronic devices 110 and 101 to enable the communication between the two devices. For example, the electronic devices 110 and 101 include transceivers configured to transmit and receive signals carrying information according to the OFDM technology. When one of the transceivers transmits a packet carrying information, binary bits of the packet are converted to data symbols. The data symbols are encoded in sub-carriers. The sub-carriers are closely spaced carrier frequencies in frequency domain and are orthogonal to each other. The sub-carrier signals are modulated in parallel according to the data symbols, and are inverse-transformed to obtain time domain signals. The time domain signals are transmitted as electromagnetic waves in the air. When one of the transceivers receives information, the transceiver receives an electrical signal in response to electromagnetic waves in the air. The electrical signal is transformed to frequency domain, and the frequency components are decoded to obtain the transmitted information.

Various noises, such as thermal noise, interference, and the like, may deteriorate signal transmission quality. In general, when interference has a much higher power concentration in an isolated narrow frequency band compared to an average noise power, the interference is narrow-band interference (NBI). When NBI is in-band with certain subcarriers, the NBI may corrupt certain subcarriers, and make those subcarriers unable to carry payload information. In addition, the transformation to frequency domain at the receiving side generally uses a limited window size, and thus the transformation to frequency domain may cause power leakage of NBI to neighboring subcarriers to corrupt more subcarriers.

According to an aspect of the disclosure, transceivers are configured to detect NBI and determine corrupted subcarriers, and then the corrupted sub-carriers can be suppressed to help with decoding success. In practice, there may exist multiple interferers that generate multiple NBI signals. The power for each individual NBI signal can be significantly different. NBI signal of higher power may overshadow those lower power NBI signals. In an example, NBI detection is achieved using an iterative approach to detect one NBI in each iteration. Depending on the number of NBI signals, the iterative approach may have variable number of iterations, variable amount of computation and processing time.

In FIG. 1, the electronic device 110 includes a receiver 120 configured to receive signals, detect multiple NBI signals in a single round of processing, and cancel or mitigate the interference caused by the NBI signals to improve signal quality. The NBI detection and mitigation process has a relatively fixed amount of computation and is suitable for implementation with integrated circuit or digital signal processor (DSP).

Specifically, the receiver 120 includes an analog processing circuit 130, an analog to digital converter (ADC) 135, a windowing module 140, a demodulator 145, a packet detector 150, a packet processing unit 155 and a NBI detector 160. These elements are coupled together as shown in FIG. 1.

The analog processing circuit 130 receives an electrical signal 131, regulates the electrical signal 131, and outputs an analog data signal 132. In an example, the electrical signal 131 is generated by an antenna in response to electromagnetic waves in the air. In another example, the electrical signal 131 is generated in response to electrical signals on one or more metal wires.

In an example, the electronic device 101 transmits information in the form of packets. When the electronic device 101 transmits a packet, the received portion of the electrical signal 131 corresponds to the transmitted packet information by the electromagnetic waves in the air. Between two packets transmission (inter packets), the electronic device 101 becomes mute, and the received portion of the electrical signal 131 corresponds to noise in the air.

The analog processing circuit 130 regulates the electrical signal 131 using analog techniques, such as amplification, compensation for offsets, adjusting an appropriate dynamic range, and the like. In an example, the analog processing circuit 130 includes a gain loop that adjusts an amplifier gain to regulate the electrical signal 131 to an appropriate dynamic range. Thus, the analog data signal 132 is suitable for subsequent circuit components to handle.

The ADC 135 receives the analog data signal 132, samples the analog data signal 132, and converts the sampled data signal into digital samples 137. The windowing module 140 is configured to use suitable windowing techniques to shape a window for weighting the digital samples 137 and suppress NBI leakage. In an example, the windowing module 140 is implemented using integrated circuit (IC). In another example, the windowing module 140 is implemented as instructions executed by a digital signal processor.

The demodulator 145 receives the weighted digital samples 142, and transforms the received signals into the frequency domain to obtain signal level and/or power at sub-carriers. In an example, the demodulator 145 includes a Fast Fourier Transform (FFT) module to transform the weighted digital samples 142 into frequency components 147 that are indicative of signal levels or power at the sub-carriers. In an example, the demodulator 145 is implemented using integrated circuit (IC). In another example, demodulator 145 is implemented as instructions executed by a digital signal processor.

The packet detector 150 receives the frequency components 147 and detects whether the received portion of the electrical signal 131 corresponds to information in a packet. When the received portion of the electrical signal 131 corresponds to packet information, the packet detector 150 detects the packet, the frequency components 147 are provided to the packet processing unit 155 for further processing. When the received portion of the electrical signal 131 does not correspond to packet information, the frequency components 147 are provided to the NBI detector 160 to detect NBI signals.

The NBI detector 160 is configured to determine an NBI threshold based on a portion of the frequency components 147 that are for sure not affected by NBI signals. Then, the NBI detector 160 compares the frequency components 147 to the NBI threshold in a single round to detect NBI signals, and determines an NBI mask to mask sub-carriers that are affected by the NBI signals. The NBI mask is then provided to the packet processing unit 155.

According to an aspect of the disclosure, the NBI detection has a relatively fixed amount of computation, and the NBI detector 160 can be implemented using integrated circuit (IC) or digital signal processor.

The packet processing unit 155 receives the frequency components 153, suppresses the sub-carriers that are affected by the NBI signals based on the NBI mask, and decodes the non-suppressed sub-carriers to obtain the packet information. The packet information is then further processed by suitable components.

Figure 2:
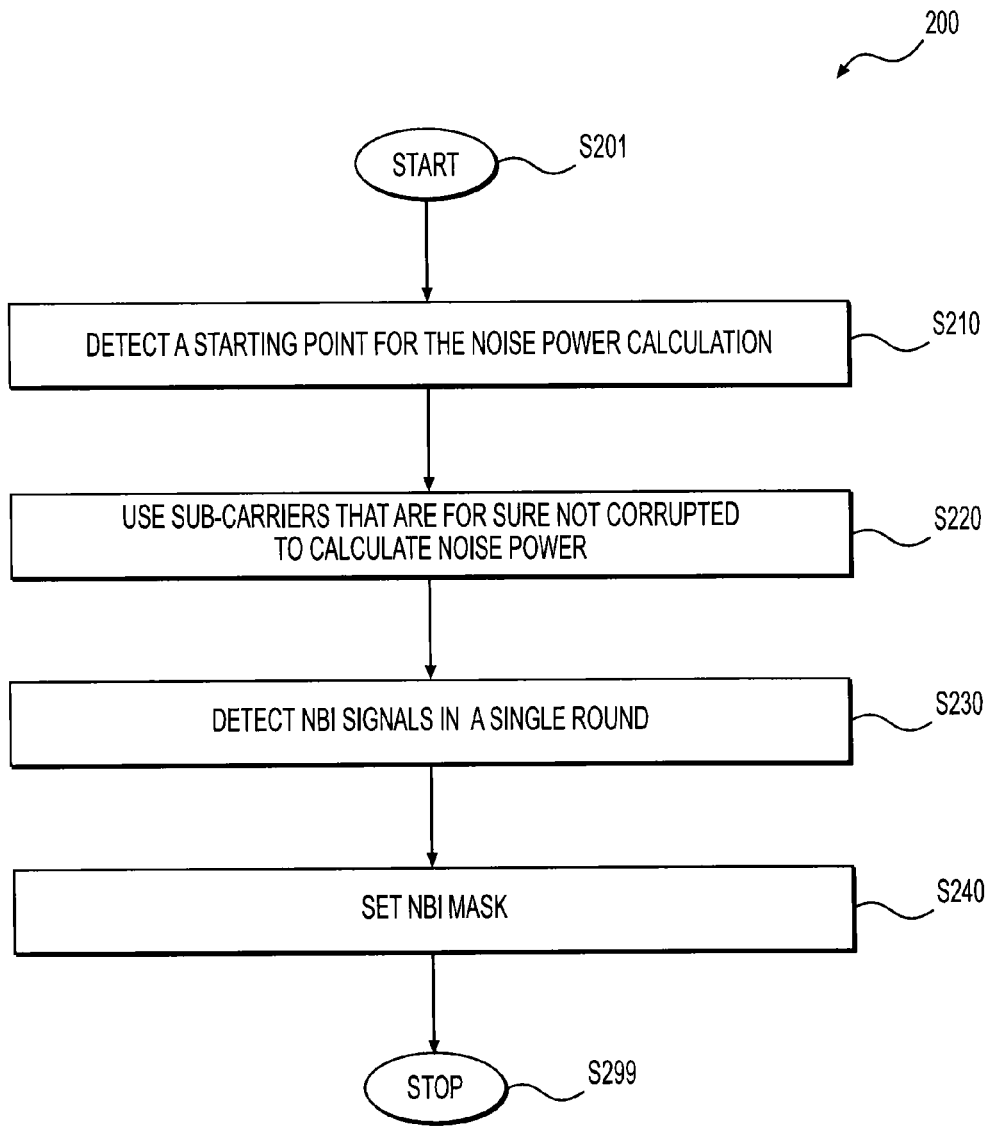
FIG. 2 shows a flow chart outlining a process 200 according to an embodiment of the disclosure.

FIG. 2 shows a flow chart outlining a process 200 according to an embodiment of the disclosure. In an example, the process 200 is executed by the NBI detector 160 to detect NBI signals and determine an NBI mask to suppress sub-carriers that are affected by the NBI signals. In an example, the NBI detector 160 receives the frequency components 147 output from the FFT module. For example, the FFT module processes the digital samples block by block. Each block includes N digital samples (N is a positive integer). The NBI detector 160 receives the frequency components 147 block by block, and accumulates power at sub-carriers over multiple blocks or calculates an average power at sub-carriers over multiple blocks to reduce background noise. Then, in an example, the NBI detector 160 executes the process 200 to operate on the accumulated power at the sub-carriers to detect NBI signals. The process starts at S201, and proceeds to S210.

At S210, a starting point for noise power calculation is determined. In an example, the sub-carriers are indexed according to the frequencies. The NBI detector 160 determines, following an index sequence, a first sub-carrier that for sure is not corrupted by the NBI signal. For example, when an NBI signal is in band with a specific sub-carrier, the NBI signal corrupts the specific sub-carrier. Further, the power of the NBI signal leaks to a lower band and an upper band to the specific sub-carrier and corrupts sub-carriers in the lower band and the upper band. In an example, the lower band of sub-carriers, the upper band of subcarriers and the specific sub-carrier need to be masked to improve decoding accuracy. The number of sub-carriers in the lower band or the upper band is denoted as a NBI mask band (NbiMaskBand), and is determined according to previous experience or statistical study. In an example, the NBI detector 160 selects a sub-carrier with a minimum power among sub-carriers in a band that is three times of NBI mask band as the first sub-carrier that for sure is not corrupted by an NBI signal.

At S220, sub-carriers that are for sure not corrupted by NBI signals are used to calculate a noise power. In an example, from the starting point and following the index of the sub-carriers, the NBI detector 160 determines first sub-carriers that are for sure not corrupted by NBI signals, accumulates the power at the first sub-carriers and calculates an average noise power (AvgPow$_{noise}$) on a single sub-carrier. The NBI detector 160 can use any suitable algorithm to determine the first sub-carriers. An algorithm example is shown in FIG. 3 and will be described in detail with reference to FIG. 3.

At S230, NBI signals are detected in a single round. In an example, the NBI detector 160 determines a first power threshold based on the calculated average noise power. In an example, the NBI detector 160 scales the average noise power by a factor (NbiThd) to determine the first power threshold. For example, the factor is in the range of two to one hundred. Further, the NBI detector 160 compares the power at each sub-carrier with the first power threshold, and detects NBI signals based on the comparison. For example, when the power at a sub-carrier is larger than the first power threshold, an NBI signal is detected at the sub-carrier.

At S240, a NBI mask is set according to the detected NBI signals. In an example, when an NBI signal at a sub-carrier (i) is detected, the NBI mask is set to suppress sub-carriers in a band [i−NbiMaskBand, i+NbiMaskBand]. In an example, when the NBI signal is very large, such as larger than a second power threshold that is multiple times of the first power threshold, the NBI mask is set to suppress sub-carriers in a larger band [i−NbiMaskBandWide, i+NbiMaskBandWide], where NbiMaskBandWide is larger than NbiMaskBand. After the NBI mask is set according to the detected NBI signals, the NBI mask is provided to the packet processing unit 155 to decode the information carried by the sub-carriers. In an example, when the packet processing unit 155 receives the frequency components 147 corresponding to packet information, the NBI detector 160 provides the NBI mask that is delayed and is determined based on the frequency components 147 of the inter packets noise. Then the process proceeds to S299 and terminates.

Figure 3:
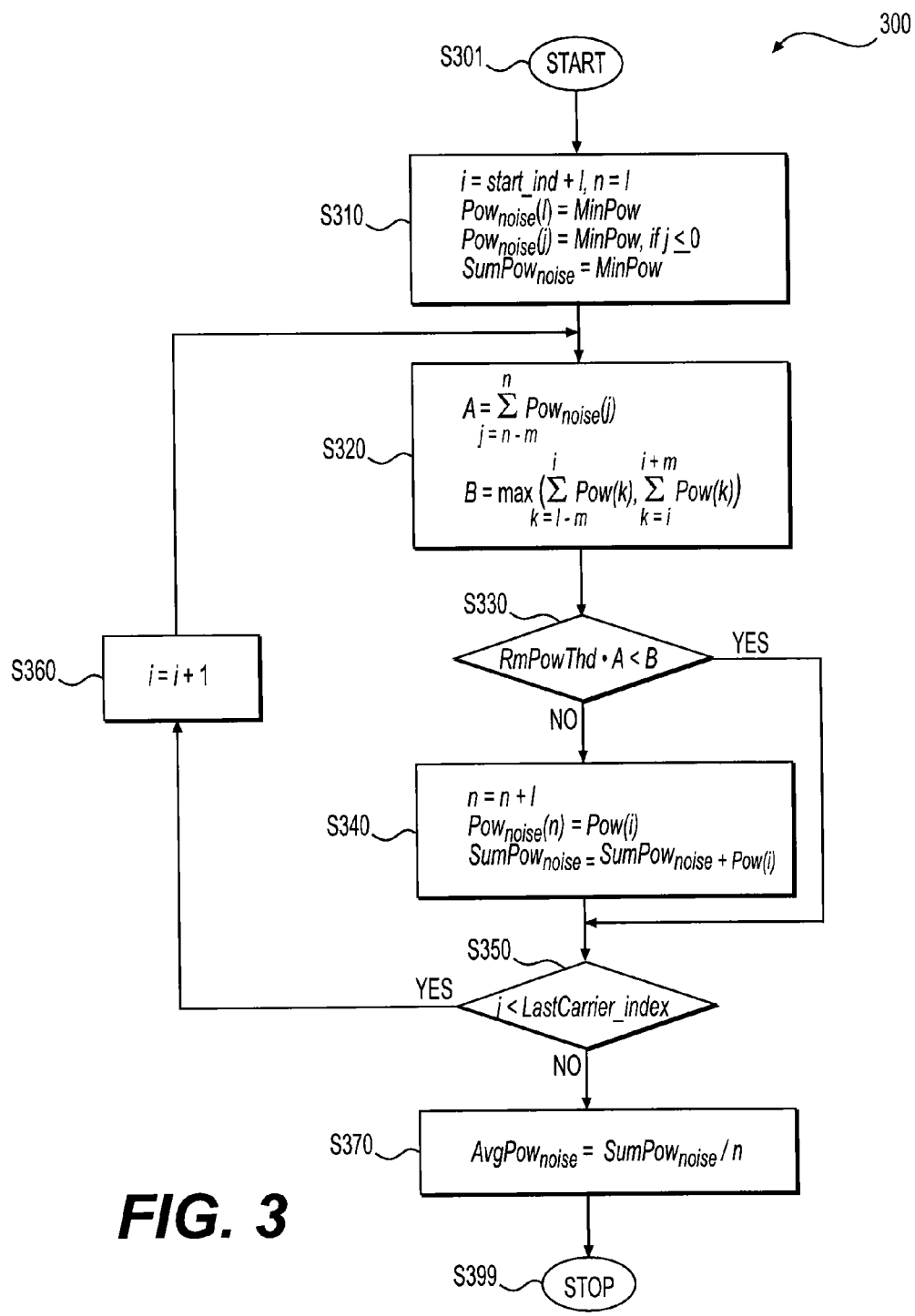
FIG. 3 shows a flow chart outlining a process 300 according to an embodiment of the disclosure.

FIG. 3 shows a flow chart outlining a process 300 illustrating an algorithm to determine sub-carriers that are for sure not corrupted by NBI signals. In an example, the process is executed by the NBI detector 160 at step S220 in the FIG. 2 example. The process starts at S301 and proceeds to S310.

At S310, variables are initialized. In an example, a starting point of a first sub-carrier that is not corrupted by NBI signals is detected, for example in step S210. Then, variables are initialized based on the first sub-carrier. Following S310, the sub-carriers are sequentially examined following the index of the sub-carriers to determine the first sub-carriers that are not corrupted by the NBI signals. In the example, variable i is an index for a current sub-carrier under examination; variable n tracks the number of members in the first sub-carriers that are determined for sure not being corrupted by NBI signals; array Pow$_{noise}$( ) stores power of the first sub-carriers; variable MinPow is the power of the first sub-carrier; SumPow$_{noise}$ tracks the power sum of the first sub-carriers that for sure are not corrupted by NBI signals.

At S320, two power measures are calculated. In the FIG. 3 example, variable m is a predetermined number of subcarriers for calculating power sum over. Power measure A is the power sum of m sub-carriers in the first sub-carriers that are not corrupted by the NBI signals. Power measure B is the larger power sum of the current sub-carrier with an upper band of sub-carriers and the current sub-carrier with a lower band of sub-carriers. The bandwidth of the lower band or the upper band is m−1.

At S330, the two power measures are compared to determine whether the current sub-carrier is corrupted by NBI signals. In the FIG. 3 example, the power measure A is scaled based on a factor (RmPowThd) that can be pre-defined based on experience. In an example, the factor RmPowThd is in the range of two to one hundred. When the power measure B is smaller than the scaled parameter A, the current sub-carrier is not corrupted by the NBI signals, the process proceeds to S340; when the power measure B is larger than the scaled parameter A, it is not sure whether the current sub-carrier is corrupted or not, the process proceeds to S350.

At S340, the current sub-carrier is added as a member of the first sub-carriers that are not corrupted by NBI signals. In the FIG. 3 example, variable n increases by one; the power of the current sub-carrier is stored in the array Pow$_{noise}$( ) and is added into the power sum (SumPow$_{noise}$) of the first sub-carriers that are not corrupted by NBI signals.

At S350, the algorithm checks whether all the sub-carriers have been examined. When all the sub-carriers have been examined, the process proceeds to S370; otherwise, the process proceeds to S360.

At S360, the index of the current sub-carrier updates and points to the next sub-carrier to be examined, and the process returns to S320.

At S370, an average noise power (AvgPow$_{noise}$) is calculated based on the power sum (SumPow$_{noise}$) of the first sub-carriers that are not corrupted by NBI signals, and the number of members in the first sub-carriers. In an example, the average noise power is used to determine sub-carriers that are corrupted by NBI signals in a single round, for example, in step S230. Then, the process proceeds to S399 and terminates.

Figure 4:
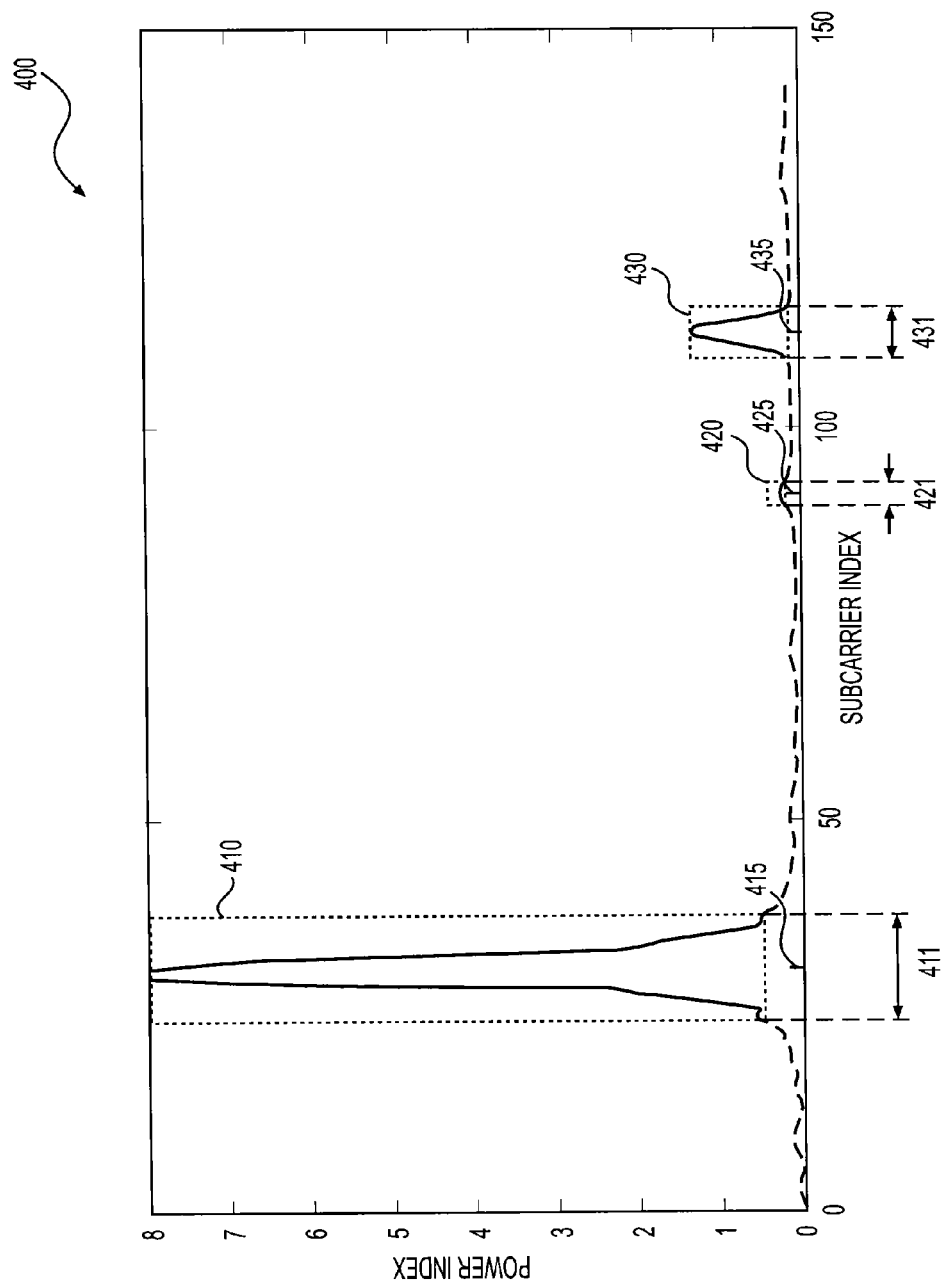
FIG. 4 shows a plot 400 for removing narrow-band interference according to an embodiment of the disclosure.

FIG. 4 shows a plot 400 for removing narrow-band interference according to an embodiment of the disclosure. In the FIG. 4 example, X-axis denotes the sub-carrier index, and Y-axis denotes a power index. In the example, sub-carriers 415, 425 and 435 have power higher than a noise power threshold for NBI detection, and three bands 411, 421 and 431 of sub-carriers are suppressed during decoding. In an example, an NBI mask is set to suppress the sub-carriers in the band 411, 421 and 431.

In the example, the sub-carrier 415 has a much higher power than the sub-carriers 425 and 435, and may have power leakage into a larger number of neighboring sub-carriers. Thus, in the example, the band 411 of sub-carriers neighboring to the sub-carrier 415 has a larger bandwidth than the bands 421 and 431 to suppress a relatively larger number of sub-carriers that may be corrupted.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for detecting interference in a signal to be decoded, the method comprising:
   receiving, at a first device, a signal having a plurality of frequency components, wherein each frequency component of the signal has an associated power;
   identifying, among the plurality of frequency components, first frequency components that are not corrupted by interference;
   determining a noise power threshold based on the first frequency components without relying on components corrupted by interference; and
   comparing the powers of the plurality of frequency components of the signal with the noise power threshold to determine second frequency components to be suppressed during decoding of the signal.

2. The method of claim 1, wherein receiving the signal comprises:
   receiving the signal at the first device during a time period when a second device does not transmit signals that use the plurality of frequency components to carry information to the first device.

3. The method of claim 2, wherein receiving the signal at the first device during the time period when the second device does not transmit the signals that use the plurality of frequency components to carry the information to the first device further comprises:
   detecting, based on the plurality of frequency components, that the plurality of frequency components do not carry the information from the second device to the first device.

4. The method of claim 1, wherein identifying, among the plurality of frequency components, the first frequency components that are not corrupted by the interference comprises:
   identifying, among the plurality of frequency components, the first frequency components that are not corrupted by narrow-band interference (NBI).

5. The method of claim 1, wherein identifying, among the plurality of frequency components, the first frequency components that are not corrupted by the interference further comprises:
   determining a first frequency component that is not corrupted by the interference; and
   comparing the power at each frequency component with power of non-corrupted frequency components to identify the first frequency components.

6. The method of claim 5, wherein determining the first frequency components further comprises:
   selecting, from a band of frequency components, a frequency component with a minimum power.

7. The method of claim 1, further comprising:
   identifying a frequency component having narrow band interference when the frequency component has a larger power than the noise power threshold; and
   suppressing the identified frequency component and frequency components in a neighbor band of the identified frequency component during decoding.

8. The method of claim 7, further comprising:
   adjusting a width of the neighbor band based on a power at the frequency component.

9. A receiving circuit, comprising:
   an interference detector configured to:
   identify, among a plurality of frequency components of a received signal, first frequency components that are not corrupted by interference, wherein each frequency component of the received signal has an associated power;

determine a noise power threshold based on the first frequency components without relying on components corrupted by interference; and compare the powers of the frequency components with the noise power threshold to determine second frequency components that are corrupted by the interference; and a processing circuit configured to suppress the second frequency components during decoding of the received signal.

10. The receiving circuit of claim 9, further comprising:
a detector configured to detect a time period when the plurality of frequency components do not carry information from another device to the receiving circuit.

11. The receiving circuit of claim 9, wherein the interference detector is configured to identify, among the plurality of frequency components, the first frequency components that are not corrupted by narrow-band interference (NBI).

12. The receiving circuit of claim 9, wherein the interference detector is configured to determine a first frequency component that is not corrupted by the interference, and compare the power at each frequency component with the power of non-corrupted frequency components to identify the first frequency components.

13. The receiving circuit of claim 12, wherein the interference detector is configured to select, from a band of frequency components, a frequency component with a minimum power.

14. The receiving circuit of claim 9, wherein the interference detector is configured to identify a frequency component having narrow band interference when the frequency component has a larger power than the noise power and set a mask that masks the identified frequency component and frequency components in a neighbor band of the identified frequency component during decoding of the received signal.

15. The receiving circuit of claim 14, wherein the interference detector is configured to adjust a width of the neighbor band based on the power at the frequency component.

16. An apparatus, comprising:
a frequency domain transform module configured to transform a received signal into a plurality of frequency components, each frequency component of the received signal having an associated power;
an interference detector configured to:
identify, among the plurality of frequency components, first frequency components that are not corrupted by interference;
determine a noise power threshold based on the first frequency components without relying on components corrupted by interference; and
compare the powers of the plurality of frequency components with the noise power threshold to determine second frequency components that are corrupted by the interference; and
a processing circuit configured to suppress the second frequency components during decoding of the received signal.

17. The apparatus of claim 16, further comprising:
a detector configured to detect a time period when the plurality of frequency components do not carry information from another apparatus to the apparatus.

18. The apparatus of claim 16, wherein the interference detector is configured to determine a first frequency component that is not corrupted by the interference, and compare the power at each frequency component with the power of non-corrupted frequency components to identify the first frequency components.

19. The apparatus of claim 18, wherein the interference detector is configured to select, from a band of frequency components, a frequency component with a minimum power.

20. The apparatus of claim 16, wherein:
the interference detector is configured to identify a frequency component having narrow band interference and set a mask that masks the identified frequency component and frequency components in a neighbor band of the identified frequency component; and
the processing circuit is configured to suppress the second frequency components according to the mask during decoding of the received signal.

\* \* \* \* \*